(12) United States Patent
Li et al.

(10) Patent No.: US 9,544,319 B2
(45) Date of Patent: Jan. 10, 2017

(54) ANOMALY DETECTION ON WEB CLIENT

(71) Applicant: Intel Corporation, Santa Clara, CA (US)

(72) Inventors: Hong Li, El Dorado Hills, CA (US); Tobias Kohlenberg, Portland, OR (US); Jim S Baca, Corrales, NM (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/129,514

(22) PCT Filed: Oct. 10, 2013

(86) PCT No.: PCT/US2013/064395
§ 371 (c)(1),
(2) Date: Dec. 26, 2013

(87) PCT Pub. No.: WO2015/053780
PCT Pub. Date: Apr. 16, 2015

(65) Prior Publication Data
US 2015/0106870 A1    Apr. 16, 2015

(51) Int. Cl.
*H04L 29/06* (2006.01)
*G06F 17/30* (2006.01)
*G06F 21/54* (2013.01)
*G06F 21/55* (2013.01)

(52) U.S. Cl.
CPC ..... *H04L 63/1425* (2013.01); *G06F 17/30867* (2013.01); *G06F 21/54* (2013.01); *G06F 21/554* (2013.01)

(58) Field of Classification Search
CPC . H04L 63/20; H04L 63/1425; G06F 17/30864

USPC .......................................................... 726/1
See application file for complete search history.

(56) References Cited

U.S. PATENT DOCUMENTS

| 6,256,620 | B1 * | 7/2001 | Jawahar | G06F 11/3495 |
| 7,849,183 | B1 * | 12/2010 | Haber | H04L 67/125 |
| | | | | 709/223 |
| 8,347,394 | B1 * | 1/2013 | Lee | 726/25 |
| 8,429,180 | B1 * | 4/2013 | Sobel et al. | 707/758 |

(Continued)

FOREIGN PATENT DOCUMENTS

WO    WO-2015053780 A1    4/2015

OTHER PUBLICATIONS

"International Application Serial No. PCT/US2013/064395, International Search Report mailed Jul. 11, 2014", 4 pgs.

(Continued)

*Primary Examiner* — Hadi Armouche
*Assistant Examiner* — Shahriar Zarrineh
(74) *Attorney, Agent, or Firm* — Schwegman Lundberg & Woessner, P.A.

(57) ABSTRACT

Embodiments for anomaly detection on a web client are generally described herein. A processor on the web client is monitored, where a web browser is installed on the web client, with the web browser arranged to render a web page, the web page including content originating from a plurality of origins. A request from the web page to store data on the web client is intercepted, with the request originating from a particular origin of the plurality of origins. The request is analyzed and approved or denied based on the particular origin.

25 Claims, 5 Drawing Sheets

(56) References Cited

U.S. PATENT DOCUMENTS

| | | | | |
|---|---|---|---|---|
| 8,458,765 | B2* | 6/2013 | Aciicmez | G06F 21/6272 726/1 |
| 8,621,635 | B2* | 12/2013 | Zeigler | G06Q 30/00 726/1 |
| 8,950,005 | B1* | 2/2015 | Torney | H04L 63/20 726/1 |
| 8,954,603 | B2* | 2/2015 | Horibuchi | H04L 29/12367 709/238 |
| 9,015,844 | B1* | 4/2015 | Franklin | G06F 21/577 713/165 |
| 2003/0115191 | A1* | 6/2003 | Copperman | G06F 17/30976 |
| 2004/0039794 | A1* | 2/2004 | Biby | H04L 12/1827 709/217 |
| 2006/0075019 | A1* | 4/2006 | Donovan | G06F 17/30867 709/203 |
| 2007/0094243 | A1* | 4/2007 | Kwak | G06F 17/30867 |
| 2007/0118607 | A1* | 5/2007 | Nelissen | G06Q 10/107 709/217 |
| 2007/0136418 | A1* | 6/2007 | Wolfe | G06F 17/30861 709/203 |
| 2008/0022378 | A1* | 1/2008 | Repasi et al. | 726/5 |
| 2008/0034424 | A1* | 2/2008 | Overcash et al. | 726/22 |
| 2008/0172338 | A1* | 7/2008 | Malcolm | G06F 21/606 705/64 |
| 2008/0263003 | A1* | 10/2008 | Imielinski | G06F 17/3064 |
| 2008/0307077 | A1* | 12/2008 | Langoulant | H04L 12/5835 709/222 |
| 2011/0055357 | A1* | 3/2011 | Kakuta | G06F 17/30873 709/219 |
| 2011/0066676 | A1* | 3/2011 | Kleyzit | G06F 17/30902 709/203 |
| 2011/0138174 | A1* | 6/2011 | Aciicmez | G06F 21/6272 713/165 |
| 2011/0247045 | A1 | 10/2011 | Rajagopal et al. | |
| 2011/0277024 | A1* | 11/2011 | Begley et al. | 726/7 |
| 2012/0254776 | A1* | 10/2012 | Corella | G06F 3/0481 715/760 |
| 2012/0297007 | A1* | 11/2012 | Burckart | G06F 17/30873 709/208 |
| 2013/0007882 | A1* | 1/2013 | Devarajan et al. | 726/24 |
| 2013/0080375 | A1 | 3/2013 | Viswanathan et al. | |
| 2013/0086261 | A1 | 4/2013 | Lim | |
| 2013/0227641 | A1* | 8/2013 | White et al. | 726/1 |
| 2013/0254836 | A1* | 9/2013 | Aciicmez | G06F 21/6272 726/1 |
| 2014/0229821 | A1* | 8/2014 | Abrahami | G06F 17/3089 715/235 |
| 2015/0089352 | A1* | 3/2015 | Conboy | H04L 67/02 715/234 |

OTHER PUBLICATIONS

"International Application Serial No. PCT/US2013/064395, Written Opinion mailed Jul. 11, 2014", 6 pgs.

Chen, Chia-Mei, et al., "Anomaly Behavior Analysis for Web Page Inspection", In: First International Conference on Networks and Communications (NETCOM), Chennai: IEEE, (Dec. 27, 2009), 358-363.

Matsunaka, Takasii, et al., "Detecting and Preventing Drive-By Download Attack via Participative Monitoring of the Web", In: Eighth Asia Joint Conference on Information Security (Asia JCIS). Seoul: IEEE,, (Jul. 25, 2013), 48-55.

\* cited by examiner

ANOMALY DETECTION ON WEB CLIENT

CROSS-REFERENCE TO RELATED APPLICATION(S)

This application is a U.S. National Stage Application under 35 U.S.C. §371 from International Application No. PCT/US2013/064395, filed Oct. 10, 2013, which is hereby incorporated by reference in its entirety.

TECHNICAL FIELD

Embodiments described herein generally relate to computer monitoring and in particular, to anomaly detection on a web client.

BACKGROUND

When a user browses a website, small amounts of information are stored on the user's machine. The information may be stored in a file that persists between browser restarts. When the user browses the same website in the future, the information may be retrieved from the file and used. One mechanism that is common is the use of cookies. A cookie, also known as an HTTP cookie, web cookie, or browser cookie, is a file that stores a limited amount of data for use during a user's browsing session (e.g., session cookie) or for multiple sessions (e.g., persistent cookie). Cookies are useful to preserve state, maintain user authentication information, or save user preferences for a website. However, cookies are limited in functionality partly due to their maximum allowable size.

In more modern browsers, a standard known as "Web Storage" supports larger storage allocation. Web Storage offers two different storage types—local storage and session storage—which act similar to persistent and session cookies, respectively. Data stored in local storage is per domain and persists after the browser is closed. Session storage is per-page-per-window and is limited to the lifetime of the window. Session storage is intended to allow separate instances of the same web application to run in different windows without interfering with each other, a use case that's not well supported by cookie.

However, with the increase of allowable size of storage objects (both local and session types), there is a threat of a malicious activity causing large amounts of data to be written or stored at a user's machine resulting in instability, inaccessibility, or other denial of service types of attacks.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Hypertext Markup Language version 5 (HTML5) is a markup language for structuring and presenting content for the World Wide Web (WWW). Web Storage is a standard supported by HTML5 and provides a client-side method for saving session information. Using a client-side scripting language, such as JavaScript®, a webpage is able to store and retrieve data from a web storage container. Thus, using Web Storage, a web application (e.g., web page, a mashup, web content) is able to store information for reuse within a session or from session to session.

Web Storage containers are typically limited to a maximum size, such as 2 megabytes (MB), 5 MB, or 10 MB. There are two types of Web Storage containers: sessionStorage and localStorage. Each act similarly, but the sessionStorage object is only available for the immediate session, while the localStorage object persists between browsing sessions. Web storage containers are linked to an origin. An origin is a tuple of domain name, application layer protocol, and port number of the HTML5 document running the script. In this manner, a web storage container may be constrained to a maximum size per origin. For example, the website "http://www.example.com/home.html" may be associated with a localStorage container. Another website "https://www.example.com/home.html" cannot access the localStorage container of "http://www.example.com/home.html" because the protocols are different (http versus https).

In many modern web applications, content from multiple origins is presented within the same presentation area. This may be referred to generically as a "mashup." A mashup typically uses and combines data, presentation, or functionality from two or more sources to create a new presentation or service. Mashups may provide related information in an aggregate display for easier consumption of data for the end user.

Some mashups are combinations of related data from several related sources. For example, a mashup for the fictional corporation Example, Inc. may use "example.com" as their domain and may provide information from subdomains, such as "news.example.com," "sports.example.com," and "weather.example.com" in a combined interface (e.g., mashup). Alternatively, as a user navigates through the "example.com" website, the user may navigate to content from subdomains, such as weather.example.com. In either situation, the question arises as to whether the distinct subdomains should be granted three quotas of Web Storage allocation (e.g., three time 5 MB for a total of 15 MB) or whether the entire web application (e.g., mashup) should be constrained to the Web Storage quota (e.g., 5 MB for the example.com and subdomains). If the first model is followed, then it may open the platform up for abuse. For example, someone with a malicious intent may create artificial subdomains (or affiliate domains) and cause the user's computer to store many 5 MB Web Storage containers, perhaps thousands or millions. Such activity would likely produce an error, cause the machine to become unresponsive, or otherwise wreak havoc. If the second model is followed, then a legitimate web application may be unnecessarily restricted from using disk space that is needed for proper operation. Similar problems may exist with affiliate domains (web applications that are related or affiliated with each other and presented together, either in a mashup or with cross-linking). What is needed is a mechanism to monitor and manage Web Storage allocation requests.

The present disclosure describes a mechanism to assess web browser activity and ensure that such activity is consistent with a storage policy. Such a mechanism is useful to detect anomalies in web browser behavior. Some described embodiments work with a plurality of browsers. Such embodiments are independent from how content is delivered by any one browser, reducing the vulnerability caused by poor implementation of the web storage mechanism in a particular browser, and also reducing or eliminating the need for an end user to choose the correct web browser for the safest experience.

Mechanisms for monitoring and managing Web Storage allocation requests may be implemented in various forms, including but not limited to a browser plug-in, client software, or firmware. The mechanisms may detect suspicious behavior from web applications, alarm users of such behavior, or enforce proper policies to reduce risks. The mechanisms may use various detection algorithms based on intrusion detection or machine learning.

Figure 1:
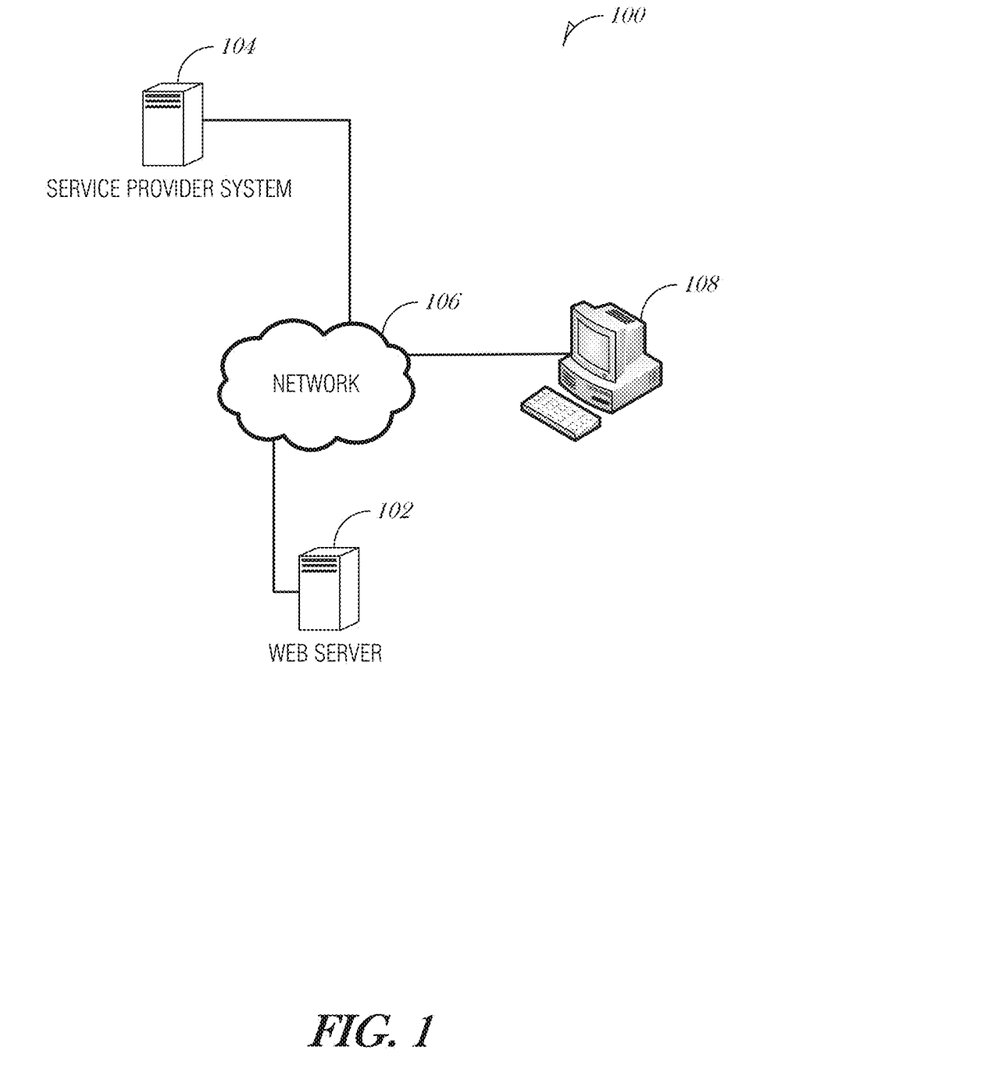
FIG. 1 is a schematic drawing illustrating a system, according to an embodiment.

FIG. 1 is a schematic drawing illustrating a system 100, according to an embodiment. The system 100 includes a web server 102, a service provider system 104, and a computing device 108, which are connected over a network 106. While the web server 102 and service provider system 104 are illustrated as a single machine in FIG. 1, in various embodiments, the web server 102 or service provider system 104 may comprise multiple servers working together (e.g., colocated, distributed, or as a cloud-based system). The computing device 108 may be any type of device including a desktop computer, smartphone, cellular telephone, mobile phone, laptop computer, tablet computer, Ultrabook®, in-vehicle computer, kiosk, or other networked device. A web client for the purposes of this disclosure includes any device capable of presenting a website to a user, such as the computing device 108.

A user may operate the computing device 108 to access a web application provided by the web server 102. When the web application attempts to store data in a localStorage or sessionStorage object via HTML5 on the computing device 108, a monitoring module on the computing device 108 intercepts the attempt and determines whether the storage instruction should proceed. In an embodiment, the monitoring module accesses a local database that has data, rules, or other information that the monitoring module may use to make the determination of whether to permit or deny the web application's storage request. In another embodiment, the monitoring module uses a remote service, such as one hosted on the service provider system 104 to assess the web application's storage request. If the storage request is granted, then the monitoring module may interface with the browser on the computing device 108, or other portions of the computing device 108 (e.g., memory manager, file system, resource scheduler, or other aspects of the operating system or firmware), to process the storage request.

Figure 2:
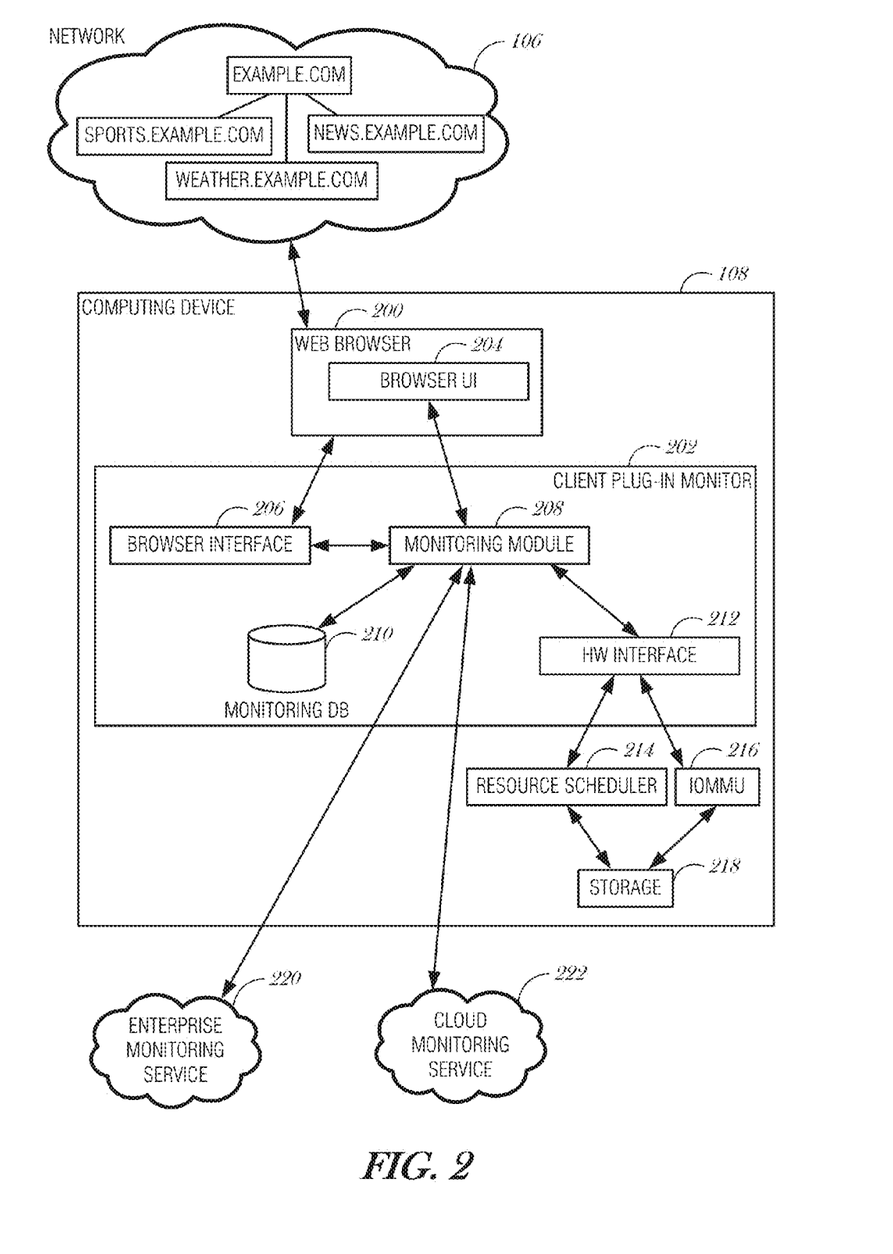
FIG. 2 is a schematic drawing illustrating a computing device for anomaly detection on a web client, according to an embodiment.

FIG. 2 is a schematic drawing illustrating a computing device 108 for anomaly detection on a web client, according to an embodiment. The computing device 108 (e.g., web client) includes a web browser 200 and a client plug-in monitor 202. The web browser 200 includes a browser user interface (UI) component 204. The browser UI component 204 is used to display a web page, alerts, user interface elements, and other objects to a user of the web browser 200.

The client plug-in monitor 202 includes a browser interface 206, a monitoring module 208, a monitoring database (DB) 210, and a hardware (HW) interface 212. When monitoring for Web Storage write requests, the monitoring module 208 may interface with the monitoring DB 210, an enterprise monitoring service 220, or a cloud monitoring service 222. The monitoring DB 210 includes information about websites, domains, and web application storage usage policies. The web application storage usage policies may be user defined or centrally defined (e.g., by an enterprise administrator or a commercial service). Use of enterprise-wide or other wide-area services may provide deeper analysis of traffic or data behavior, resulting in more intelligent algorithms to distinguish legitimate requests from potential malicious activity.

In operation, the browser interface 206 intercepts storage requests initiated by web pages that are served by a website and processed by the web browser 200. The monitoring module 208 receives a notification of the request from the browser interface 206 and may check the request against the monitoring DB 210, enterprise monitoring service 220, or cloud monitoring service 222 for the legitimacy of the request. The monitoring module 208 provides responsive actions accordingly (e.g., user alert, deny/permit storage request). When the monitoring module 208 denies a request, the monitoring module 208 may add the requesting origin to a blacklist to block future storage requests from the origin. Additionally or alternatively, the monitoring module 108 may be arranged to block storage of data on the apparatus, such as by interfacing with the HW interface 212.

The HW interface 212 may interface with a resource scheduler 214 or an input/output memory management unit (IOMMU) 216, where the resource scheduler 214 or the IOMMU 216 may perform reads or writes to storage 218. The IOMMU 216 may restrict memory access based on some policies, while the resource scheduler 214 may restrict access to various resources based on other policies.

FIG. 2 illustrates one example of how the mechanism may work to prevent disk fill-up by malicious websites. However, the idea of adding client-side runtime monitors can be implemented to prevent other types of bugs, insecure browser implementations, or malicious attacks. Furthermore, the decision process to allow/deny storage allocation may be enhanced by more intelligent decision engines and services. Some examples of the characteristics that may be used to evaluate the behavior include, but are not limited to: speed of adding new data, number of subdomains, frequency of subdomain changes, and ratio of read vs. write for the data, etc. Such parameters or characteristics may be controlled, at least in part, by rules defined in a policy stored at the monitoring DB 210, an enterprise monitoring service 220, or a cloud monitoring service 222.

In addition to monitored behavior, a machine learning or other decision-making mechanism may be used to determine what actions should be permitted or denied in a particular policy. This determination may be performed at the server level (e.g., service provider system 104) or the client level (e.g., computing device 108), or using both client and server in combination. It may also be performed using a collaborative/cloud-based approach distributed between many clients.

A policy may include one or more rules. A rule may be composed of two parts: an object and a property. Objects may be things or actions. For example, objects may be a "domain name," "subdomain name," or "web application." Further examples of objects (as actions) include "write request" or "read request."

Properties are used to define permissions with respect to the object. Examples of properties include "permit 5 MB per subdomain," "restrict subdomains from using web storage," "permit 20 MB per web application," etc. Objects and properties may be conveyed in a standardized language, such as extensible markup language (XML), or some specific schema using a standardized language.

Figure 3:
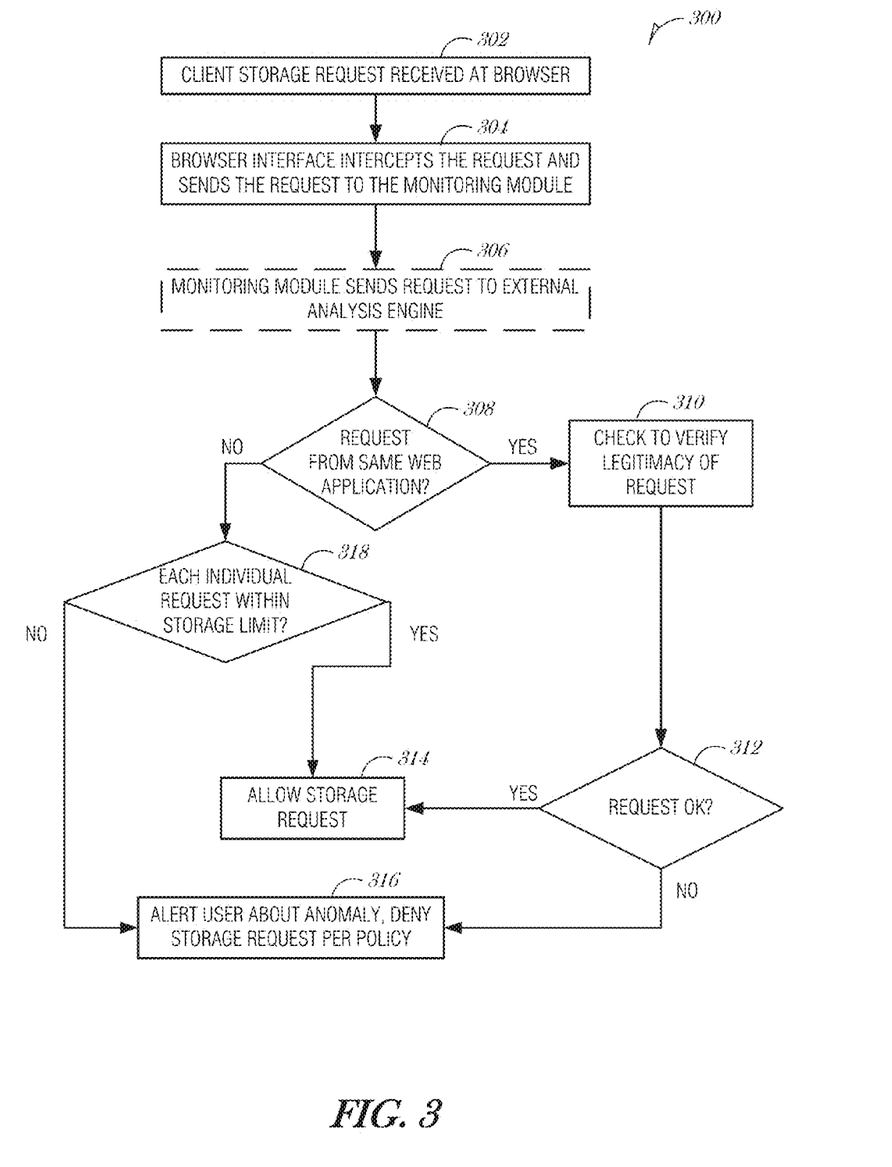
FIG. 3 is a control flow diagram illustrating a process to monitor and evaluate events, and enforce a policy, according to an embodiment.

FIG. 3 is a control flow diagram illustrating a process 300 to monitor and evaluate storage requests, and enforce a policy, according to an embodiment. At block 302, a client storage request is received at a browser. The client storage request may be encapsulated in a client-side script. For example, a client-side JavaScript® may use a localStorage object to store a key and value pair in the object with a localStorage.setItem( ) operation.

At block 304, a browser interface module intercepts the request and sends the request to a monitoring module. The browser interface module may be incorporated into the browser using an application programming interface (API) such that when a script in a web application attempts to store data in a localStorage or sessionStorage object, the operation is trapped by the browser interface module.

At block 306, optionally, the monitoring module may send the request to an external analysis engine. The external analysis engine may provide an enterprise-wide or network-wide service to analyze and determine the validity of write requests. Using enterprise-wide or network-wide services may have the advantage of using data, metrics, and statistics from a larger pool of machines to make more intelligent decisions on whether to permit or deny a storage request.

At block 308, a check is made of whether the request originated from the same web application. If the request is from the same web application as a previous request, then at block 310, a check is made to verify the legitimacy of the request. In an embodiment, the monitoring module may access a monitoring database to verify the legitimacy of the request. The monitoring database may include whitelists or blacklists, which when available may provide an automatic determination of whether to permit or deny a request from a given web application, domain, or other identifying characteristic contained in the whitelist or blacklist. Additionally, the monitoring database may include parameters, thresholds, or other data used by the monitoring module to determine the legitimacy.

At decision block 312, it is determined whether the request is OK. For example, if the request originated from a known web application that exists on a whitelist, then the request may be approved. Alternatively, if the request is from a web application on a blacklist, then the request may be denied. If the request is approved, then at block 314, the storage request is allowed. If the request is denied, then at block 316, the storage request is denied and a user alert is generated. The user alert may be in the form of a popup window, a log entry, a status bar indication, or other types of notifications (audio, video, multimedia, graphical, etc.).

Returning to block 308, if the request is not from the same web application, then at decision block 318, a determination is made as to whether each individual storage request is within a storage limit. The storage limit may be set by the browser or by a setting for the monitoring module. The storage limit may be user-defined. If, for example, the storage limit is 5 MB per origin, then at block 318 it is determined whether the storage request is within this quota for the script and related origin. If the individual requests are under the storage limit, then at block 314, the storage request is allowed. Alternatively, if the individual request is over the storage limit, then at block 316, the storage request is denied and the user may be alerted.

In an embodiment, at block 318, additional processing may occur to examine the individual requests. For example, even when each individual request is within a limit, a malicious app may add a large number of subdomains to create denial of service attack. So, in addition to checking each individual limit for a particular subdomain in a web application, a total storage amount is calculated or accessed, and the total storage amount is analyzed to determine whether it is within a limit Additionally or alternatively, processing may include determining whether a total number of subdomains making storage requests is reasonable (e.g., under 100 subdomains in a given session).

Although FIG. 3 illustrates one mechanism for detecting client-side web browser anomalies, it is understood that other types of analysis may be used by the monitoring module or the external analysis engines. For example, the monitoring module or external analysis engines may provide a script malware detection service. Scripts that have no white space, have loops that appear to be an infinite loop or long running, use recursion, or have other attributes may be considered unsafe. Such scripts may be denied a storage request due to this conclusion. External analysis engines may be used to analyze network traffic and data behavior. For example, if an unusually large number of storage requests are made by a certain domain, origin, group of subdomains, or group of affiliated domains, then the web application may be blacklisted. The domain/origin may be blacklisted until or unless approved by a user.

Figure 4:
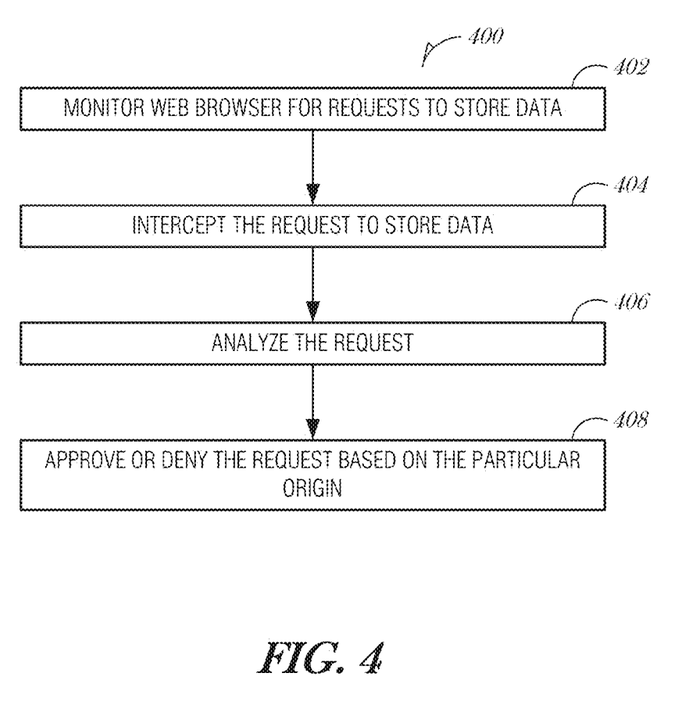
FIG. 4 is a flow diagram illustrating a method for anomaly detection on a web client, according to an embodiment.

FIG. 4 is a flow diagram illustrating a method 400 for anomaly detection on a web client, according to an embodiment. At block 402, a web browser is monitored. The web browser is installed on a web client (e.g., computing device 108). The monitoring may be performed by a processor of the web client. The web browser is arranged to render a web page, where the web page includes content originating from a plurality of origins. In an embodiment, the web browser is one of a plurality of web browsers installed on the web client, and wherein analyzing the request comprises analyzing the request according to a setting specific to the web browser, the setting specifying a policy to a handle storage request from one of a plurality of related origins. In a further embodiment, each of the plurality of web browsers includes a different setting for handling a storage request from one of a plurality of related origins.

At block 404, a request is intercepted from the web page, where the request is to store data on the web client, and where the request originates from a particular origin of the plurality of origins.

At block 406, the request is analyzed. In an embodiment, the request from the web page to store data on the apparatus is a HTML5 request to store data in a localStorage object.

At block 408, the request is approved or denied based on the particular origin. In an embodiment, analyzing and approving the request comprises identifying the particular origin, querying a database with the particular origin to determine whether the particular origin is on a white list of origins, and approving the request when the particular origin is on the white list. In an embodiment, the database is stored at the web client. In another embodiment, the database is stored at a server remote from the web client.

In an embodiment, analyzing and approving the request comprises analyzing a characteristic of web browser behavior, and approving the request based on the characteristic of web browser behavior. In various embodiments, the characteristic of web browser behavior is at least one of: a speed of storing data to the apparatus, a number of subdomains of the origin requesting to store data, a frequency of subdomain changes, or a ratio of reads and writes of stored data.

In a further embodiment, a notification is presented to a user of the web client when denying the request. For example, the user may be notified of a request to store data and may be provided to option to allow the request to continue (e.g., the storage to occur), thereby overriding the automatic response to the potentially malicious activity.

In an embodiment, the method 400 is performed using a plug-in for the web browser.

Hardware Platform

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Figure 5:
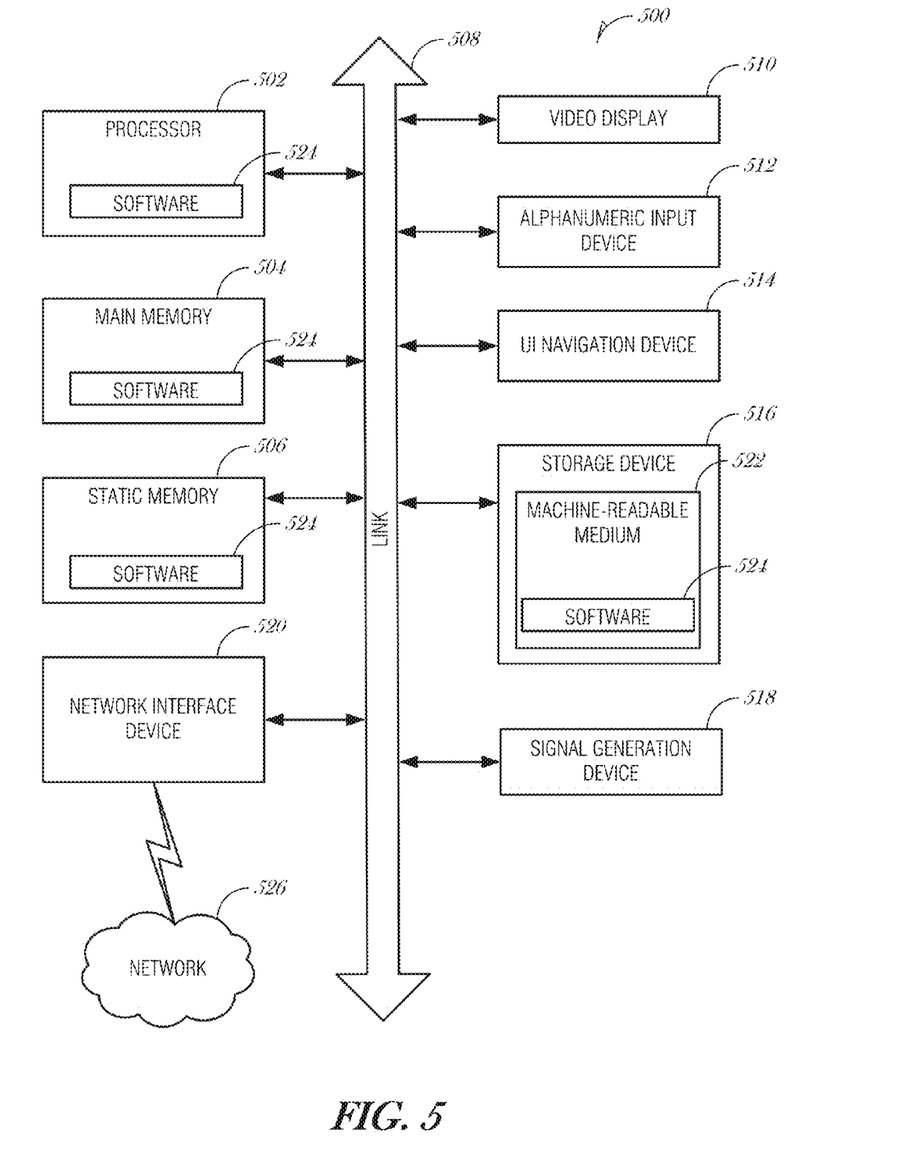
FIG. 5 is a block diagram illustrating an example machine upon which any one or more of the techniques (e.g., methodologies) discussed herein may perform, according to an example embodiment.

FIG. 5 is a block diagram illustrating a machine in the example form of a computer system 500, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a personal computer (PC), a tablet PC, a set-top box (STB), a personal digital assistant (PDA), a mobile telephone, a web appliance, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computer system 500 includes at least one processor 502 (e.g., a central processing unit (CPU), a graphics processing unit (GPU) or both, processor cores, compute nodes, etc.), a main memory 504 and a static memory 506, which communicate with each other via a link 508 (e.g., bus). The computer system 500 may further include a video display unit 510, an alphanumeric input device 512 (e.g., a keyboard), and a user interface (UI) navigation device 514 (e.g., a mouse). In one embodiment, the video display unit 510, input device 512 and UI navigation device 514 are incorporated into a touch screen display. The computer system 500 may additionally include a storage device 516 (e.g., a drive unit), a signal generation device 518 (e.g., a speaker), a network interface device 520, and one or more sensors (not shown), such as a global positioning system (GPS) sensor, compass, accelerometer, or other sensor.

The storage device 516 includes a machine-readable medium 522 on which is stored one or more sets of data structures and instructions 524 (e.g., software) embodying or utilized by any one or more of the methodologies or functions described herein. The instructions 524 may also reside, completely or at least partially, within the main memory 504, static memory 506, and/or within the processor 502 during execution thereof by the computer system 500, with the main memory 504, static memory 506, and the processor 502 also constituting machine-readable media.

While the machine-readable medium 522 is illustrated in an example embodiment to be a single medium, the term "machine-readable medium" may include a single medium or multiple media (e.g., a centralized or distributed database, and/or associated caches and servers) that store the one or more instructions 524. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 524 may further be transmitted or received over a communications network 526 using a transmission medium via the network interface device 1020 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

ADDITIONAL NOTES & EXAMPLES

Example 1 includes subject matter (such as a device, apparatus, or machine) comprising a system for anomaly detection on a web client, comprising: a monitoring module arranged to: monitor a web browser installed on the apparatus, the web browser arranged to render a web page, the web page including content originating from a plurality of origins; intercept a request from the web page to store data on the apparatus, the request originating from a particular origin of the plurality of origins; analyze the request; and approve or deny the request based on the particular origin.

In Example 2, the subject matter of Example 1 may optionally include, wherein the web browser is one of a plurality of web browsers installed on the apparatus, and wherein to analyze the request, the monitoring module is arranged to analyze the request according to a setting specific to the web browser, the setting specifying a policy to a handle storage request from one of a plurality of related origins.

In Example 3 the subject matter of any one or more of Examples 1 to 2 may optionally include, wherein each of the plurality of web browsers include a different setting for handling a storage request from one of a plurality of related origins.

In Example 4 the subject matter of any one or more of Examples 1 to 3 may optionally include, wherein to analyze and approve the request, the monitoring module is arranged to: identify the particular origin; query a database with the particular origin to determine whether the particular origin is on a white list of origins; and approve the request when the particular origin is on the white list.

In Example 5 the subject matter of any one or more of Examples 1 to 4 may optionally include, wherein the database is stored at the apparatus.

In Example 6 the subject matter of any one of Examples 1 to 5 may optionally include, wherein the database is stored at a server remote from the apparatus.

In Example 7 the subject matter of any one or more of Examples 1 to 6 may optionally include, wherein the monitoring module is a plug-in for the web browser.

In Example 8 the subject matter of any one or more of Examples 1 to 7 may optionally include, wherein to analyze and approve the request, the monitoring module is arranged to: analyze a characteristic of web browser behavior; and approve the request based on the characteristic of web browser behavior.

In Example 9 the subject matter of any one or more of Examples 1 to 8 may optionally include, wherein the characteristic of web browser behavior is at least one of: a speed of storing data to the apparatus, a number of subdomains of the origin requesting to store data on the apparatus, a frequency of subdomain changes, or a ratio of reads and writes of stored data.

In Example 10 the subject matter of any one or more of Examples 1 to 9 may optionally include, wherein the request from the web page to store data on the apparatus is a HTML5 request to store data in a localStorage object.

In Example 11 the subject matter of any one or more of Examples 1 to 10 may optionally include, comprising a notification module arranged to present a notification to a user of the apparatus when the monitoring module denies the request.

In Example 12 the subject matter of any one or more of Examples 1 to 11 may optionally include, wherein to deny the request, the monitoring module is arranged to add the particular origin to a blacklist to block future storage requests from the particular origin.

In Example 13 the subject matter of any one or more of Examples 1 to 12 may optionally include, wherein to deny the request, the monitoring module is arranged to block storage of data on the apparatus.

Example 14 includes subject matter for anomaly detection on a web client (such as a method, means for performing acts, machine readable medium including instructions that when performed by a machine cause the machine to performs acts, or an apparatus configured to perform) comprising monitoring using a processor on the web client, a web browser installed on the web client, the web browser arranged to render a web page, the web page including content originating from a plurality of origins; intercepting a request from the web page to store data on the web client, the request originating from a particular origin of the plurality of origins; analyzing the request; and approving or denying the request based on the particular origin.

In Example 15, the subject matter of Example 14 may optionally include, wherein the web browser is one of a plurality of web browsers installed on the web client, and wherein analyzing the request comprises analyzing the request according to a setting specific to the web browser, the setting specifying a policy to a handle storage request from one of a plurality of related origins.

In Example 16 the subject matter of any one or more of Examples 14 to 15 may optionally include, wherein each of the plurality of web browsers include a different setting for handling a storage request from one of a plurality of related origins.

In Example 17 the subject matter of any one or more of Examples 14 to 16 may optionally include, wherein analyzing and approving the request comprises: identifying the particular origin; querying a database with the particular origin to determine whether the particular origin is on a white list of origins; and approving the request when the particular origin is on the white list.

In Example 18 the subject matter of any one or more of Examples 14 to 17 may optionally include, wherein the database is stored at the web client.

In Example 19 the subject matter of any one of Examples 14 to 18 may optionally include, wherein the database is stored at a server remote from the web client.

In Example 20 the subject matter of any one or more of Examples 14 to 19 may optionally include, wherein the method is performed using a plug-in for the web browser.

In Example 21 the subject matter of any one or more of Examples 14 to 20 may optionally include, wherein analyzing and approving the request comprises: analyzing a characteristic of web browser behavior; and approving the request based on the characteristic of web browser behavior.

In Example 22 the subject matter of any one or more of Examples 14 to 21 may optionally include, wherein the characteristic of web browser behavior is at least one of: a speed of storing data, a number of subdomains of the origin requesting to store data, a frequency of subdomain changes, or a ratio of reads and writes of stored data.

In Example 23 the subject matter of any one or more of Examples 14 to 22 may optionally include, wherein the request from the web page to store data on the apparatus is a HTML5 request to store data in a localStorage object.

In Example 24 the subject matter of any one or more of Examples 14 to 23 may optionally include, presenting a notification to a user of the web client when denying the request.

In Example 25 the subject matter of any one or more of Examples 14 to 24 may optionally include, adding the particular origin to a blacklist to block future storage requests from the particular origin.

In Example 26 the subject matter of any one or more of Examples 14 to 25 may optionally include, blocking storage of data on the web client.

Example 27 includes a machine-readable medium including instructions for anomaly detection on a web client, which when executed by a machine, cause the machine to perform operations of any one of the examples 1-26.

Example 28 includes an apparatus comprising means for performing any of the examples 1-26.

Example 29 includes an apparatus for anomaly detection on a web client, comprising: means for monitoring using a processor on the web client, a web browser installed on the web client, the web browser arranged to render a web page, the web page including content originating from a plurality of origins; means for intercepting a request from the web page to store data on the web client, the request originating from a particular origin of the plurality of origins; means for analyzing the request; and means for approving or denying the request based on the particular origin.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure, for example, to comply with 37 C.F.R. §1.72(b) in the United States of America. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. An apparatus for anomaly detection on a web client, the apparatus comprising:
    a monitoring circuit to:
        monitor a web browser installed on the apparatus, the web browser arranged to render a web page corresponding to a domain name, the web page including content originating from a plurality of origins, wherein each origin of the plurality of origins includes at least one respective subdomain name associated with the domain name, a respective application layer protocol, and a respective port number;
        intercept a request from the web page to store data on the apparatus, the request originating from a particular origin of the plurality of origins, wherein the request from the web page to store data on the apparatus is a HTML5 request from the respective subdomain of the particular origin to store data in a localStorage object;
        analyze the request, wherein analyzing the request includes analyzing characteristics of web browser behavior including a count of subdomains of the origin requesting to store data on the apparatus and a frequency of subdomain changes; and
        approve or deny the request based on a respective subdomain of the at least one respective subdomain of the particular origin and based on the characteristics of the web browser behavior.

2. The apparatus of claim 1, wherein the web browser is one of a plurality of web browsers installed on the apparatus, and wherein to analyze the request, the monitoring circuit to analyze the request according to a setting specific to the web browser, the setting specifying a policy to a handle storage request from one of a plurality of related origins.

3. The apparatus of claim 2, wherein each of the plurality of web browsers include a different setting for handling a storage request from one of a plurality of related origins.

4. The apparatus of claim 1, wherein to analyze and approve the request, the monitoring circuit to:

identify the respective subdomain of the particular origin;
query a database with the particular origin to determine whether the respective subdomain of the particular origin is on a white list of subdomains; and
approve the request when the respective subdomain of the particular origin is on the white list.

5. The apparatus of claim 4, wherein the database is stored at the apparatus.

6. The apparatus of claim 4, wherein the database is stored at a server remote from the apparatus.

7. The apparatus of claim 1, wherein the monitoring circuit implements a plug-in for the web browser.

8. The apparatus of claim 1, wherein the characteristics of web browser behavior further include a speed of storing data to the apparatus and a ratio of reads and writes of stored data.

9. The apparatus of claim 1, comprising a notification circuit to present a notification to a user of the apparatus when the monitoring circuit denies the request.

10. The apparatus of claim 1, wherein to deny the request, the monitoring circuit to add the respective subdomain of the particular origin to a blacklist to block future storage requests from the respective subdomain of the particular origin.

11. The apparatus of claim 1, wherein to deny the request, the monitoring circuit to block storage of data on the apparatus.

12. A method for anomaly detection on a web client, the method comprising:
monitoring using a processor on the web client, a web browser installed on the web client, the web browser arranged to render a web page corresponding to a domain name, the web page including content originating from a plurality of origins, wherein each origin of the plurality of origins includes at least one respective subdomain name associated with the domain name, a respective application layer protocol, and a respective port number;
intercepting a request from the web page to store data on the web client, the request originating from a particular origin of the plurality of origins, wherein the request from the web page to store data on the web client is a HTML5 request from the respective subdomain of the particular origin to store data in a localStorage object;
analyzing the request, wherein analyzing the request includes analyzing characteristics of web browser behavior including a count of subdomains of the origin requesting to store data on the apparatus and a frequency of subdomain changes; and
approving or denying the request based on a respective subdomain of the at least one respective subdomain of the particular origin and based on the characteristics of the web browser behavior.

13. The method of claim 12, wherein the web browser is one of a plurality of web browsers installed on the web client, and wherein analyzing the request comprises analyzing the request according to a setting specific to the web browser, the setting specifying a policy to a handle storage request from one of a plurality of related origins.

14. The method of claim 13, wherein each of the plurality of web browsers include a different setting for handling a storage request from one of a plurality of related origins.

15. The method of claim 12, wherein analyzing and approving the request comprises:
identifying the respective subdomain of the particular origin;
querying a database with the particular origin to determine whether the respective subdomain of the particular origin is on a white list of subdomains; and
approving the request when origin to determine whether the respective subdomain of the particular origin is on the white list.

16. The method of claim 15, wherein the database is stored at the web client.

17. The method of claim 15, wherein the database is stored at a server remote from the web client.

18. The method of claim 12, wherein the method is performed using a plug-in for the web browser.

19. The method of claim 12, wherein the characteristics of web browser behavior further include a speed of storing data and a ratio of reads and writes of stored data.

20. The method of claim 12, comprising adding origin to determine whether the respective subdomain of the particular origin to a blacklist to block future storage requests from origin to determine whether the respective subdomain of the particular origin.

21. The method of claim 12, comprising blocking storage of data on the web client.

22. A non-transitory machine-readable medium including instructions for anomaly detection on a web client, which when executed by a machine, cause the machine to:
monitor using a processor on the web client, a web browser installed on the web client, the web browser arranged to render a web page corresponding to a domain name, the web page including content originating from a plurality of origins, wherein each origin of the plurality of origins includes a respective subdomain name associated with the domain name, a respective application layer protocol, and a respective port number;
intercept a request from the web page to store data on the web client, the request originating from a particular origin of the plurality of origins, wherein the request from the web page to store data on the web client is a HTML5 request from the respective subdomain of the particular origin to store data in a localStorage object;
analyze the request, wherein analysis of the request includes analysis of characteristics of web browser behavior including speed of storing data to the apparatus, a count of subdomains of the origin requesting to store data on the web client, a frequency of subdomain changes, and a ratio of reads and writes of stored data; and
approve or deny the request based on the respective subdomain of the particular origin and based on the characteristics of the web browser behavior.

23. The apparatus of claim 1, wherein the-analysis of the request and the approval or denial of the request occur prior to the web browser rendering the web page.

24. The apparatus of claim 1, wherein the-analysis of the request and the approval or denial of the request occur prior to the web browser rendering any unchanged subdomain of the web page.

25. The apparatus of claim 1, further comprising denying the request in response to at least one of:
the count of subdomains of the origin requesting to store data exceeding a first parameter defined in a policy; or
the frequency of subdomain changes exceeding a second parameter defined in the policy.

* * * * *